United States Patent
Koszo

(10) Patent No.: US 9,512,038 B2
(45) Date of Patent: Dec. 6, 2016

(54) FLY ASH PROCESSING AND MANUFACTURE OF ARTICLES INCORPORATING FLY ASH COMPOSITIONS

(75) Inventor: Sandor Koszo, Hawthorne (AU)

(73) Assignees: Newsouth Innovations Pty Limited, Sydney (AU); Vecor IP Holdings Ltd, Hong Kong (CN)

(*) Notice: Subject to any disclaimer, the term of this patent is extended or adjusted under 35 U.S.C. 154(b) by 866 days.

(21) Appl. No.: 13/518,269

(22) PCT Filed: Dec. 22, 2010

(86) PCT No.: PCT/AU2010/001730
§ 371 (c)(1),
(2), (4) Date: Jul. 17, 2012

(87) PCT Pub. No.: WO2011/075783
PCT Pub. Date: Jun. 30, 2011

(65) Prior Publication Data
US 2013/0052351 A1 Feb. 28, 2013

(30) Foreign Application Priority Data
Dec. 22, 2009 (AU) .................................. 2009906235

(51) Int. Cl.
*C04B 33/135* (2006.01)
*B05D 3/02* (2006.01)
(Continued)

(52) U.S. Cl.
CPC ......... *C04B 28/021* (2013.01); *C04B 33/1352* (2013.01); *C04B 35/18* (2013.01);
(Continued)

(58) Field of Classification Search
CPC ...... C04B 35/6263; C04B 33/19; C04B 35/18; C04B 28/021
(Continued)

(56) References Cited

U.S. PATENT DOCUMENTS 2,576,565 A  11/1951  Brown
3,341,341 A *  9/1967  Corson ................. C04B 18/027
106/405

(Continued)

FOREIGN PATENT DOCUMENTS

JP  10-025171 A  1/1998
WO  98-01404 A1  1/1998

OTHER PUBLICATIONS

Examination report of EP10838423.1-1354 dated May 30, 2014.
(Continued)

*Primary Examiner* — Nahida Sultana
(74) *Attorney, Agent, or Firm* — Kelly & Kelley, LLP

(57) ABSTRACT

A fly ash composition including fly ash and a plasticizing agent and being in a powder form is disclosed. The plasticizing agent is capable of binding the fly ash particles in the fly ash composition together on pressing of the fly ash composition. Processes of forming shaped articles containing fly ash may utilize the fly ash composition and/or mixtures containing fly ash and have low water content and may exhibit sufficient green strength to be handled by industrial equipment.

9 Claims, 3 Drawing Sheets

(51) Int. Cl.
   *C04B 35/622*         (2006.01)
   *C04B 28/02*           (2006.01)
   *C04B 35/18*           (2006.01)
   *C04B 35/19*           (2006.01)
   *C04B 35/626*         (2006.01)

(52) U.S. Cl.
   CPC .......... C04B 35/19 (2013.01); C04B 35/6263 (2013.01); *C04B 2235/3201* (2013.01); *C04B 2235/3206* (2013.01); *C04B 2235/3208* (2013.01); *C04B 2235/3232* (2013.01); *C04B 2235/3272* (2013.01); *C04B 2235/349* (2013.01); *C04B 2235/3418* (2013.01); *C04B 2235/3463* (2013.01); *C04B 2235/3472* (2013.01); *C04B 2235/3481* (2013.01); *C04B 2235/5427* (2013.01); *C04B 2235/5436* (2013.01); *C04B 2235/604* (2013.01); *C04B 2235/606* (2013.01); *C04B 2235/61* (2013.01); *C04B 2235/656* (2013.01); *C04B 2235/6562* (2013.01); *C04B 2235/6565* (2013.01); *C04B 2235/6567* (2013.01); *C04B 2235/72* (2013.01); *C04B 2235/727* (2013.01); *C04B 2235/9615* (2013.01); *Y02P 40/69* (2015.11)

(58) Field of Classification Search
   USPC ........................................ 264/667, 37.1, 601
   See application file for complete search history.

(56) References Cited

U.S. PATENT DOCUMENTS

| | | | | |
|---|---|---|---|---|
| 4,354,876 | A * | 10/1982 | Webster | C04B 18/06 106/611 |
| 4,840,671 | A * | 6/1989 | Lynn | B09B 3/00 106/705 |
| 4,911,757 | A * | 3/1990 | Lynn | B09B 3/00 106/697 |
| 5,259,697 | A * | 11/1993 | Allen | C22B 7/006 106/697 |
| 5,521,132 | A | 5/1996 | Talmy et al. | |
| 5,622,556 | A * | 4/1997 | Shulman | C04B 16/087 106/676 |
| 6,583,217 | B1 * | 6/2003 | Li | C04B 26/006 264/DIG. 49 |
| 7,128,158 | B2 * | 10/2006 | Nguyen | C09K 8/80 166/280.2 |
| 7,264,673 | B2 * | 9/2007 | Kayali | C04B 33/1352 106/705 |
| 7,879,939 | B2 * | 2/2011 | Prince | C08K 3/22 524/442 |
| 2003/0183988 | A1 | 10/2003 | Das et al. | |
| 2005/0109242 | A1 * | 5/2005 | Kayali | C04B 33/1352 106/705 |
| 2006/0066013 | A1 * | 3/2006 | Amritphale et al. | 264/669 |
| 2007/0277472 | A1 * | 12/2007 | Sinclair | 52/605 |
| 2008/0090720 | A1 * | 4/2008 | Warmerdam et al. | 501/86 |
| 2009/0250660 | A1 * | 10/2009 | Nayak | C04B 28/021 252/182.32 |
| 2010/0064623 | A1 * | 3/2010 | Sinclair | 52/596 |

OTHER PUBLICATIONS

S. Bhasin et al., "Effect of pyrophyllite additions on sintering characteristics of fly ash based ceramic wall tiles", British Ceramic Transactions, 2003, pp. 83-86, vol. 102, No. 2.

Zimmer et al: "Fly ash of mineral coal as ceramic tiles raw material", Waste Management, vol. 27, No. 1, Nov. 11, 2006 (Nov. 11, 2006), pp. 59-68.

Isao Fukumoto et al: "Mechanical Properties of Composite Material Using Coal Ash and Clay", Journal of Solid Mechanics and Materials Engineering, vol. 3, No. 5, May 29, 2009 (May 29, 2009), 739-747.

Lingling X et al: "Study on fired bricks with replacing clay by fly ash in high volume ratio", Construction and Building Materials, vol. 19, No. 3, Apr. 1, 2005 (Apr. 1, 2005), pp. 243-247.

Jonker A et al: "An evaluation of selected waste resources for utilization in ceramic materials applications", Journal of the European Ceramic Society, vol. 25, No. 13, Aug. 1, 2005 (Aug. 1, 2005), pp. 3145-3149.

Chandran et al: "Effect of addition of talc on the sintering characteristics of fly ash based ceramic tiles", Journal of the European Ceramic Society, vol. 25, No. 1, Jan. 1, 2005 (Jan. 1, 2005), pp. 81-88.

M. Serhat Baspinar et al: "Production of fired construction brick from high sulphate-containing fly ash with boric acid addition", Waste Management & Research, vol. 28, No. 1, May 7, 2009 (May 7, 2009), pp. 4-10.

* cited by examiner

FLY ASH PROCESSING AND MANUFACTURE OF ARTICLES INCORPORATING FLY ASH COMPOSITIONS

TECHNICAL FIELD

The present disclosure relates generally to the processing of fly ash, fly ash compositions and shaped articles containing fly ash and to methods of forming such articles. The disclosure is particularly directed to ceramic manufacture where the fly ash in the article matrix is sintered. The process has been developed especially, but not exclusively for the manufacture of relatively thin elements, such as tiles or slabs and is herein described in that context. However it is to be appreciated that the process has broader application and may be used for the production of a vast range of articles including decorative and structural elements and industrial ceramics.

BACKGROUND

Fly ash is a byproduct from the burning of coal in coal fired power stations and is produced in abundance. Fly ash is a very fine powder, easily airborne, and typically contains minute amounts of heavy metals such as cadmium, chromium, zinc and lead that make disposal problematic. In trying to minimise the environmental impact of fly ash, various uses of fly ash have been contemplated to both aid in fly ash disposal and to obtain some economic return. However difficulties have been encountered in manufacturing fly ash containing articles such as tiles or the like that can be manufactured on industrial scale, are cost competitive with existing products that they replace, are of a consistent quality and perform adequately over a range of structural and technical properties.

SUMMARY

In an embodiment, the disclosure provides a fly ash composition and mixture including fly ash and a plasticising agent and being in a powder form, wherein the plasticising agent is capable of binding the fly ash particles in the fly ash composition together on pressing of the fly ash composition. Processes of forming shaped articles containing fly ash may utilise the fly ash composition and/or mixture and have low water content and which may exhibit sufficient green strength to be handled by industrial equipment

BRIEF DESCRIPTION OF THE DRAWINGS

The foregoing summary is illustrative only and is not intended to be in any way limiting. In addition to the illustrative aspects, embodiments, and features described above, further aspects, embodiments, and features will become apparent by reference to the drawings and the following detailed description and examples.

In the drawings.

DETAILED DESCRIPTION

Figure 1:
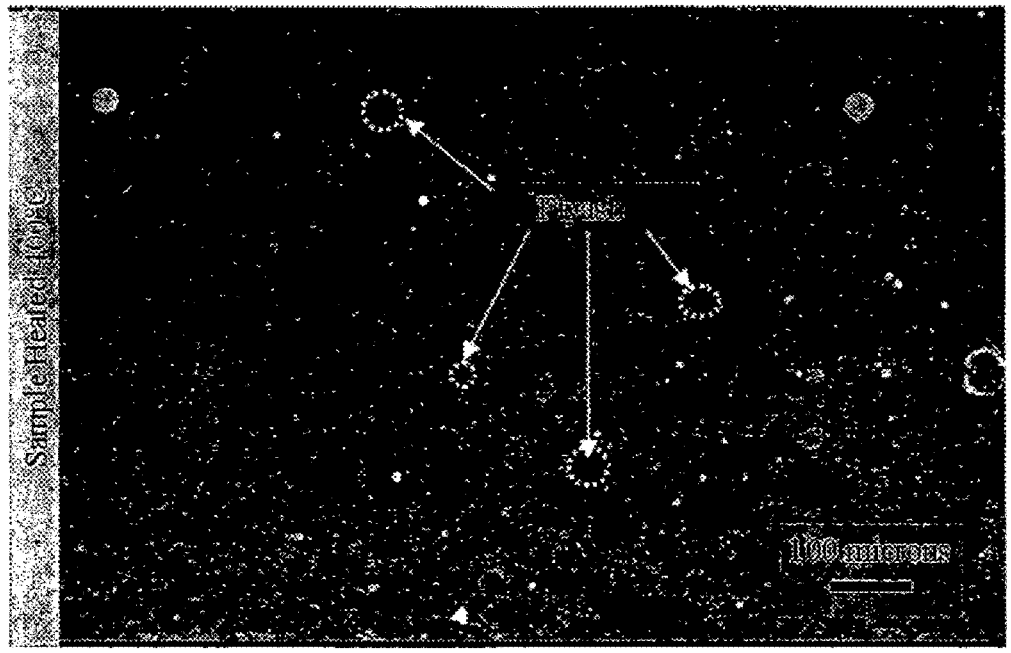
FIG. 1 is an SEM image showing microstructure of tile sample after heating at 400° C. for 3 min.

This disclosure is generally directed to processing of fly ash to make useful products and articles. In particular the disclosure includes processes for forming fly ash compositions which in some embodiments may be used in processes for forming shaped articles which are sintered. This is particularly applicable to ceramic manufacture. The disclosure is also directed to forming green articles which have sufficient strength that they can be handled in industrial environments and to processes for forming shaped articles having sintered fly ash.

In a first aspect, the disclosure provides a fly ash composition comprising fly ash and a plasticising agent and being in a powder form, wherein the plasticising agent is capable of binding the fly ash particles in the fly ash composition together on pressing of the fly ash composition.

In one form, the average particle size of the composition is less than 50 micron, and in another form, is less than 35 micron. In a particular embodiment the plasticising agent is intimately mixed with the fly ash. In one form the plasticising agent is at least partially coated on the fly ash particles.

In accordance with the above aspect, a plasticising agent is provided as part of the fly ash composition. The plasticising agent may be made from a single component or may be made from multiple components. These components may be premixed or may be added separately to the fly ash at the same time or at different times or stages of the process. Accordingly in the context of the specification, the term "a plasticising agent" includes within its scope these different alternatives and is not limited to a single component.

In accordance with the above aspect, a fly ash composition is provided which is in a powder form (i.e. a particulate flowable state). As such the fly ash composition has a near dry appearance and texture. In one form, the water content in the fly ash composition is less than 3 wt % of the total weight of the composition. In one form, the water content in the fly ash composition is less than 1 wt % of the total weight of the composition.

In one form, the fly ash composition is used in a mixture to form a shaped ceramic article, where the mixture is pressed and then fired. In such mixtures additional water may need to be added to sufficiently hydrate the plasticising agent to allow it to bind the fly ash particles under pressing. However, the water content in the mixture may still be low, such as below 12 wt % of the total mixture and even less than 6 wt % and this has advantages in manufacturing of the shaped article in a commercial operation as will be described in more detail below.

Pressing of the composition is required to allow the plasticising agent to bind the fly ash particles together to form a green article that has green strength. In use, the plasticising agent may only "temporarily" bind the fly ash blend in the sense that such binding is only provided to gain sufficient strength to allow a green article that results from the pressing to retain its shape during the manufacture process. This binding process is not required after firing where the strength of the article is derived from sintering of the fly ash matrix.

In one form, the fly ash composition has a high percentage of fly ash. In one form the fly ash composition includes greater than 70% fly ash by dry weight of the composition.

In one form, the fly ash composition includes from 70 to 95% fly ash by dry weight of the composition.

The fly ash used may be class F, C or a combination of Class F and Class C. Class F fly ash is produced from bituminous or brown coal and is mainly siliceous. According to ASTM classification, Class F fly ash contains a total of at least 70% of its compounds being of silicon oxide, aluminium oxide and iron oxide. Class C fly ash is derived from sub-bituminous and lignite coal. Class C fly ash is rich with calcium oxide. Whilst the typical content calcium oxide in class F fly ash is between 2-4% and is generally lower than 10%, the typical content of calcium oxide in class C fly ash is between 10% and 20% and can be as high as 26%. In one form, solely, or at least principally, Class F fly ash is used which is advantageous from a cost of manufacture point of view as Class F is typically cheaper to acquire than Class C fly ash.

In one form, the plasticising agent exhibits appropriate rheological behavior to allow it to spread under the applied pressure to aid in the temporary binding process to provide strength in the pressed article. In one form, the plasticising agent comprises aluminium silicate with substantial rheological properties. In a particular form, the plasticising agent comprises silicate mineral clay.

In one form, the fly ash composition includes from 5 to 30% plasticising agent by dry weight of the composition. In one form, the fly ash composition includes from 5 to 15% plasticising agent by dry weight of the composition.

In one form, the fly ash used in the fly ash composition is less than or equal to 100 microns. Typically the fly ash is initially screened through an appropriate size sieve to remove larger size particles and impurities.

In particular form, a superplasticiser may form part of the plasticising agent in the mixture. The superplasticiser may be added to the fly ash composition or in conjunction with the addition of water provided in the mixture. The advantage of using a superplasticiser is that it aids dispersion of the water under the application of pressure to the mixture and thereby reduces the amount of water that is required to the mixture. Superplasticisers are dispersing admixtures and are a special class of water reducing agents. They are organic polymers and operate by virtue of their electrostatic properties to de-flocculate the fly ash particles to create fluidity in the mixture. One type of superplasticiser is a pure sodium salt of a polynapthalene sulphonate made by Handy Chemicals and commercially available under the trade name DISAL.

In a particular form, the composition further comprising one or more ceramic additive in a total amount of from 5 to 15% of the dry weight of the composition. In one form, the one or more ceramic additives is selected from the group comprising feldspar, pure silica, and talc. The addition of other ceramic additives can be advantageously used to alter properties of a resultant ceramic product such as its strength, toughness, or water absorption characteristics. Colour additives may also be included such as oxides to alter colouring in the resultant article.

In one form, the one or more ceramic additive is intimately mixed with the fly ash and plasticising agent.

In one form, the fly ash used in the fly ash composition undergoes a decarbonisation process to reduce the carbon content in the fly ash. In one form, the fly ash is treated so it has a LOI (Loss on Ignition) value of less than 2% and in one form from 0.5-1%. The LOI refers to the mass loss of a combustion residue whenever it is heated in an air or oxygen atmosphere and as such is able to provide a measure of the carbon content in the fly ash. In the context of the present specification the LOI values of the fly ash are analyzed at heating the fly ash in the presence of air to 950° C. The unburned carbon in fly ash may be separated by any known separating technique, or combination of techniques such as gravity separation, electrostatic separation and froth flotation.

In one form, the fly ash may be pre-screened so that the average particle size of the fly ash added to form the composition is less than 150 micron and in one form, less than 100 micron. Prescreening of the fly ash composition in this way enables the removal or larger fly ash particles which typically have higher carbon content, thereby allowing a reduction in the LOI of the fly ash.

In one form, the fly ash is milled so as to reduce the particle size. In a particular form the fly ash is milled as part of forming the fly ash composition so as to reduce the particle size. In one form, the particle size of the components in the milled fly ash blend precursor is less than 50 micron and in one form the particle size is reduced to less than or equal to 35 micron. In one form, the milled components are screened, typically in the milling process, to ensure that the required particle size distribution is present in the fly ash composition.

In a particular form, the fly ash composition including at least one component of the plasticising agent and possibly other additives are combined and milled. A benefit of milling the fly ash is that by reducing the size of the particles enables better burn out of the remaining carbon in the fly ash particles during sintering of the green article. Further by milling the entire components of the fly ash composition assists in intimate mixing of the components arriving at a homogeneous micronized powder. And yet a further benefit of milling is that the sintered article's water absorption is lowered and final flexural strength is increased by increasing the packing density in the fly ash blend.

The inventor has found that a fly ash composition according to at least one form above, is able to be used in making high quality ceramic products, such as high quality tiles and slabs for use in buildings, in an commercial operation that is cost competitive to existing tile operations. Moreover, the fly ash composition may form the entire constituents (on a dry basis) of the mixture used in making the ceramic product, or may be added in less proportions to a ceramic mixture. A feature of the fly ash composition is that it can be provided in a homogeneous miconized powder state which allows it to perform consistently under firing which is an essential element of manufacturing consistently high quality ceramic products. Further, the fly ash composition does not require high water contents to become effective to produce green articles having sufficient green strength to be moved by industrial handling equipment both of which are very important in efficient manufacturing of the articles.

An advantage of this aspect is that the fly ash composition may be supplied as feedstock to a manufacturing plant. Once on site, water and possibly one or more other components (for example a component of the plasticising agent or other additive(s)) are added to form the mixture for pressing and firing and optionally decorating.

In accordance with a second aspect, the disclosure provides a method of forming a shaped article having a matrix containing sintered fly ash, the method comprising the steps of: providing in a mould a mixture containing the fly ash composition according to any form described above; pressing the particulate fly ash mixture in the mould to temporarily bind the mixture to form a green article shaped by the mould; and firing the green article to sinter the fly ash.

In one form, the mixture contains additional water to that contained in the fly ash composition. In one form, the water content in the mixture prior to pressing is less than 12 wt % of the total weight of the mixture. In one form, the water content in the green article is less than 12 wt % of the total weight of the mixture. In a particular form, the water content in the mixture and/or the green article is less than 6%.

In a particular form, the modulus of rupture of the green article is greater than 1.5 kg/cm$^2$. The modulus of rupture as referred to throughout this specification of the green article is a measure of the flexural strength of the article in its green state (i.e. prior to sintering of the article) and is calculated using a three point bending flexural test. Sufficient green strength (i.e. having a modulus of rupture equal to or greater than 1.5 kg/cm$^2$) is important in making the shaped articles in an industrial environment to enable appropriate handling of the articles, for example by automated handling equipment as required.

The amount of the fly ash composition that is used in the mixture can vary. A feature of the fly ash composition is that it can make up the entire mixture (on a dry basis) and be used to manufacture high quality ceramic products. The composition is provided in the powder form and can be supplied as feedstock to a mould without requiring further substantive processing (such as spray drying or the like). Additional water may be added to bring the water content up to a desired level and the resultant mixture is pressed and fired. In another form, the fly ash composition may constitute a much lower proportion of the mixture. In such an arrangement, the mixture may comprise mineral clays or other ceramic components known in the art to make up the bulk of the mixture. Accordingly, in one form, the mixture comprises from 20 to 98 wt % of the fly ash composition by dry weight of the mixture. In another form, the mixture comprises from 70 to 98 wt % of the fly ash composition by dry weight of the mixture.

In one form, the components in the mixture may be mixed in a granulating mixer prior to being supplied to the mould to ensure consistency in the mixture.

In one form, the mixture may include one or more other ceramic additive (beyond those that may already form part of the fly ash composition) to further refine the properties of the shaped article. The one or more ceramic additive may be selected from the group comprising feldspar, pure silica, talc, silicate mineral clay, Wollastonite and other standard ceramic additives.

In one form, the mixture further comprises other additives. In one form the mixture further comprises superplasticiser. In one form, the superplasticiser is added with the water into the mixture.

In a third aspect, the disclosure provides a method of forming a shaped article having a matrix containing sintered fly ash, the method comprising the steps of: providing a mixture containing fly ash, water, and a plasticising agent, the mixture being in a particulate flowable state; pressing the mixture to allow the plasticising agent to temporarily bind the mixture to form a green article having a modulus of rupture of greater than 1.5 kg/cm$^2$; and firing the green article so as to sinter the fly ash.

In a particular form of the third aspect, a pressure of greater than or equal to 200 kg/cm$^2$ is applied to the fly ash blend.

The mixture according to the second or third aspects has substantially no green strength prior to pressing. In one form, the mixture is in a generally particulate or micronized powder state having an average particle size of less than 50 micron and a water content of less than 12 wt %. The plasticising agent and the water alone may not be in sufficient quantities to provide the required plasticity at atmospheric pressure, but the mixture in its near dry form can be fed into a pressing device to apply the required pressure to shape the article. The additional input (pressure) is required to produce the resultant plasticity to at least temporarily bind the fly ash particles in the mixture together to such extent that the pressed article has a modulus of rupture of at least 1.5 kg/cm$^2$ and can be automatically handled by machines and be sintered in suitable equipment such as a roller kiln. Such an arrangement is advantageous as this combined action of creating sufficient green strength does not require relatively high levels of water and/or plasticising agent to drive the solidification process and achieve the increase in green strength under near dry conditions. In this way the water and/or plasticising agent content may be kept low. The problem with using fly ash with high water content and plasticising agents and or other temporary binders, is that the curing/drying process is an energy intensive process, requiring about 10 to 16 hours and is prone to high levels of cracking of the cured shaped article.

In a fourth aspect, the present disclosure provides a method of forming a shaped article having a matrix containing sintered fly ash, the method comprising the steps of: forming a mixture containing fly ash, water, and a plasticising agent; forming a green article in a desired shape from the mixture, wherein during forming of the green article, pressure of greater than 200 kg/cm$^2$ is applied to the mixture, the green article having a water content of less than 10 wt % of the total weight of the green article; and firing the green article so as to sinter the fly ash.

In a particular form of either the third or fourth aspects of the invention described above, the water content is equal to or less than 6%. In particular form, the water content is from 4 to 6%.

In a particular form of either the second, third or fourth aspect, the shaped article is relatively thin as compared to its surface area. Such articles find use in buildings or civil construction as internal and external wall or floor tiles or slabs. In one form, the thickness of the shaped article is less than 40 mm and in a particular form is less than or equal to 20 mm, and can go as low as 3 mm in thickness.

In use the combination of the pressing, low water content and plasticising agent provides the strength in the resultant green article. The inventor has found that such a combination can provide surprisingly high green strength which can facilitate commercial scale manufacture of the articles as it allows the automatic industrial scale handling in a factory environment. In a particular form, where the shaped article has a thickness of less than 40 mm, the modulus of rupture of the green article is greater than 1.5 kg/cm$^2$. Green articles having this strength can be handled, dried and decorated in a commercial production facility.

In yet a fifth aspect, the disclosure provides a method of forming a shaped green article containing fly ash, the article having thickness of less than 40 mm, the method comprising the step of: forming the green article from a mixture containing fly ash, water and a plasticising agent; pressing the fly ash blend at a pressure of greater than 200 kg/cm$^2$ whereby the green article has a water content of less than 12 wt % of the total weight of the green article, and the modulus of rupture of the green article is greater than 1.5 kg/cm$^2$.

In yet a sixth aspect, the disclosure provides a method of forming a shaped green article containing fly ash, the article having thickness of less than 40 mm, the method comprising the step of: forming a green article in a desired shape from a mixture containing fly ash, water and plasticising agent, the water and plasticising agent being present in an amount only sufficient to develop the required plasticity and act as a temporary binder under pressure; providing strength in the green article by pressing the mixture at a pressure of greater than 200 kg/cm² whereby the resultant modulus of rupture of the green article is greater than 1.5 kg/cm².

In a particular form of the sixth aspect, the green article has a water content of less than 12 wt % of the total weight of the green article and in a particular form the water content is less than 6 wt %. In particular form, the water content is from 4 to 6 wt %.

In a particular form of either the second, third, fourth, fifth or sixth aspects the mixture is pressed at a pressure of greater than 200 kg/cm². In a particular form the mixture is pressed by uni-axial pressing at a pressure from 300 kg/cm² to 400 kg/cm². In one form, the pressure is greater than 400 kg/cm². Whilst the method can be operated at these higher pressures it is typically more expensive to apply the higher pressures with limited benefit and according pressures of less than 450 kg/cm² is considered preferred.

A particular advantage of any one of the second, third, fourth, fifth or sixth aspect is that the green article is provided with sufficiently low moisture content and adequate green strength to allow for direct firing of the article without requiring separate curing of the green article. Further, if considered desirable to do so, the article may be heated up to 250° C. in order to prepare the green article for decoration, this heat treatment typically taking no longer than 10 to 15 minutes, which is still sufficient time to enable some drying of the green article. Even allowing for moderate heating of the green articles for decoration, the energy consumed and equipment required is substantially less than that required in previous fly ash processing techniques, or standard ceramic manufacturing processes that required long (in the order of 12-16 hours) curing/drying processes. This is a significant benefit in a commercial facility as it can significantly reduce the energy and infrastructure requirements that would be otherwise need if curing/drying of the green article was necessary.

According to seventh aspect, the disclosure provides a method of forming a shaped article having a matrix containing sintered fly ash, the method comprising the steps of: forming a green article in a desired shape from the a mixture containing fly ash and having a water content less than 12 wt % of the total weight of the mixture; and firing the green article containing substantially the same water content present as at forming of that green article so as to sinter the fly ash in the article matrix.

In a particular form, the water content is less than 8% and in a particular form is less than 6%. In particular form, the water content is from 4 to 6%.

In one form of this seventh aspect, the green article is fired without any substantial curing of the green article after it is formed.

In shaping the article, the mixture containing the fly ash may be fed into, for formed in, individual moulds. The mixture is then pressed to bind the mixture and form individual shaped articles in a green state which are then subsequently decorated and fired. In an alternative form, the mixture which is bound by the plasticising agent may be shaped after pressing to form the green articles in their final shape. For example the mixture may be formed in an intermediate state as a slab which is then cut into smaller units to form the green articles for firing.

In one form according to any one of the second, third, fourth, fifth or seventh aspects the mixture incorporates a fly ash composition according to the first aspect. In another form, the mixture incorporates components (e.g. fly ash, plasticising agent, mineral clay and/or optionally ceramic additives) as otherwise described in relation to the fly ash composition according to the first form, but those components being provided separately to the mixture. For example the plasticising agent provided as part of the mixture may be made from a single component or may be made from multiple components. These components may be premixed or may be added separately to the mixture at the same time or at different times or stages of the process. However, to obtain a more homogeneous powder, it is considered preferred to combine the plasticising agents and mill them together. Accordingly in the context of the specification, the term "a plasticising agent" includes within its scope these different alternatives and is not limited to a single component.

Furthermore, according to any one of the second, third, fourth, fifth, sixth or seventh aspects of the invention the amount of the fly ash in the mixture may vary. If the fly ash composition according to the first aspect of the invention is used, then that fly ash composition may make up the entire mixture (on a dry basis). The composition is provided in the powder form and can be supplied directly in that form to a mould. Additional water may be added to bring the water content up to a desired level and the resultant mixture is pressed and fired. In this form, the mixture may comprise greater than 70 wt % fly ash and as much as 95 wt % fly ash by dry weight of the mixture. In another form, the fly ash may constitute a much lower proportion of the mixture. In such an arrangement, the mixture may comprise mineral clays or other ceramic components known in the art to make up the bulk of the mixture. Accordingly, in one form, the mixture comprises from 20 to 98 wt % of the fly ash composition by dry weight of the mixture. In another form, the mixture comprises from 80 to 98 wt % of the fly ash composition by dry weight of the mixture.

In another form according to any one of the second, third, fourth, fifth, sixth or seventh aspects the mixture incorporates components (e.g. fly ash, plasticising agent, mineral clay and/or optionally ceramic additives) as otherwise described in relation to the fly ash composition according to the first aspect, but those components are provided separately to the mixture. In this latter form, the components may be provided in quantities that would be equivalent to the mixture compositions described above when the fly ash composition was utilised. The mixing of the various components may be carried out in a high speed granulating mixer.

In one form, the shaped article is formed as a high quality ceramic and may be used as an internal or external wall and floor tile.

In a particular form, the method of any one of the second, third fourth, fifth, sixth or seventh aspect comprises the further step of decorating the article using ceramic decorating materials and equipments prior to firing. In one form, this decorating step involves heating of the green article to allow application of an engobe or other decorative coating to the green article. Heating of the green article is typically in the range of 150 to 250° C. and may cause a further reduction in the water content of the green article and/or increase in the green strength which can further facilitate handling and firing of the article. The surface of the article may also be shaped with imprints or patterns as desired.

In a particular form according to any one of the second, third, fourth, fifth, sixth or seventh aspects, the green article is subjected to a staged firing process to sinter the fly ash. In a first phase, the green article is subjected to firing at a temperature less than 400° C. to allow moisture to escape from the green article.

The firing process may include a second phase where the temperature is increased to allow the carbon released in the fly ash particles to ignite and burn out. In one form, where the fly ash is milled to a particle size of less than 50 micron the carbon is able to self ignite, providing some free energy during the sintering process. Typically the temperature range is in the order of 500-950° and more preferably in the range of 650-850°. If the fly ash contains low carbon content (with say a LOI of less that 2%) this firing phase may be truncated or even omitted.

To produce a high quality ceramic product, it is preferable that all of the carbon is burnt out prior to increasing the firing temperature beyond 850° C.-950° C. If the carbon is not burnt out, the remaining carbon will burn at a much greater rate at these higher temperatures demanding oxygen that is not available in the shaped article, leading to oxidization and cracking.

In a further phase of the firing process a sintering process of the article takes place. Typically the firing temperature is in the range of 1000° C. to 1250° C. and in one form from 1100 to 1220° C. At this phase the green article sinters and typically shrinks about 6 to 10 percent.

In a further phase of the firing process a further sintering process of the article takes place. Typically the firing temperature is in the range of 1150° C. to 1250° C. and in one form from 1170 to 1235° C. At this phase some of the aluminium silicate and other ceramic additives in the matrix reach melting point and substantially close or reduce the voids between the already shrunk fly ash particles, leading to a slight increase in the size of the already shrunken article.

In a final phase a cooling process of the article takes place. Typically the cooling process can be at an aggressive high rate of up to 200° C. per minute. This is a significantly faster and less energy intensive process compared to standard ceramics manufacturing process. Aggressive cooling is possible because the sintered fly ash is already in a crystallized form so only limited, if any, additional crystals are formed in the article on rapid cooling. As the rapid crystal formation is the primary reason for cracking, the likelihood of cracking in the sintered article is greatly reduced.

EXAMPLES

Example 1

Tests were conducted to analyse the microstructural and phase transformations of compressed sample tiles containing fly ash.

Sample Preparation:

Fly ash was blended with aluminium silicate and soda-feldspar, in the following proportions (by dry weight):

| Fly ash | 80 wt % |
|---|---|
| Aluminium Silicate | 10 wt % |
| Soda-feldspar | 10 wt % |

The chemical analysis of the samples was conducted using X-ray fluorescence techniques (XRF) and the chemical species is represented in terms of its oxide.

Fly Ash

| Compound | Raw Material (Wt %) | Size fraction <150 microns (wt %) | Size fraction >150 micron (Wt %) |
|---|---|---|---|
| $SiO_2$ | 66.3 | 66.0 | 62.4 |
| $Al_2O_3$ | 23.66 | 23.78 | 27.1 |
| $Fe_2O_3$ | 4.98 | 5.02 | 5.03 |
| $K_2O$ | 1.09 | 1.06 | 1.3 |
| CaO | 1.09 | 1.08 | 1.05 |
| $TiO_2$ | 0.99 | 0.99 | 1.04 |
| MgO | 0.64 | 0.64 | 0.75 |
| $Na_2O$ | 0.06 | 0.04 | 0.11 |
| $P_2O_5$ | 0.21 | 0.21 | 0.14 |
| LOI | 0.5% | 0.45% | 1.77 |

Soda Feldspar

| Compound | Wt % |
|---|---|
| $SiO_2$ | 67.44 |
| $Al_2O_3$ | 18.96 |
| $Fe_2O_3$ | 0.23 |
| $K_2O$ | 0.33 |
| CaO | 0.31 |
| MgO | 0.30 |
| $Na_2O$ | 10.84 |
| LOI | 0.62 |

Aluminium Silicate

| Compound | Wt % |
|---|---|
| $SiO_2$ | 56.04 |
| $Al_2O_3$ | 26.51 |
| $Fe_2O_3$ | 1.06 |
| $K_2O$ | 3.13 |
| MgO | 0.97 |
| $TiO_2$ | 1.47 |
| $Na_2O$ | 0.50 |
| LOI | 9.73 |

The blended mixture was then sieved to remove larger particles (>150 microns). This was done since it was assumed that the organic carbons were present in greater proportions in these size ranges.

After sieving, the blended mixture was milled in a ring mill The resulting composition had the appearance of a micronized powder. Water was added to the milled composition to improve mouldability. The mixture was sieved in a 325 mesh sieve to prevent agglomeration.

The samples were then again thoroughly mixed.

3 g of the sample was used to prepare a substrate for sintering studies by compaction in a die under 1.5 tonne load applied in a hydraulic press giving an applied pressure of 400 kg/cm$^2$.

The compacted substrates were then subjected to the following sintering cycle in a horizontal tube furnace:
  a. 400° C.—3 min
  b. 850° C.—3 min
  c. 1100° C.—3 min
  d. 1250° C.—5 min
  e. 1250° C.—10 min Sintering of Ceramic Tiles:

The dimensions of the samples were noted after each stage of the sintering cycle, and the diametrical and volumetric shrinkages were calculated based on the original substrate dimensions. Diametrical shrinkage of the samples was observed to be 10% after sintering at 1250° C., while less than 2% shrinkage was observed at temperatures of 1100° C. and lower. The increase in the sintering time from 5 min to 10 min at 1250° C., led to a further 0.5% shrinkage of the material. Along with the decrease in the diameter, there was a decrease in the thickness of the sample when sintered at 1250° C., resulting in an overall volumetric shrinkage of 25%.

Initial Diameter: 20.30 mm, Thickness=6.2 mm

| S/No. | Temp | Time | Diameter | Thickness | Diametrical Shrinkage (%) | Volume Shrinkage (%) |
|---|---|---|---|---|---|---|
| 1 | 400° C. | 3 min | 20.27 mm | 6.20 mm | 0.148 | 0.29 |
| 2 | 850° C. | 3 min | 20.22 mm | 6.18 mm | 0.396 | 1.10 |
| 3 | 1100° C. | 3 min | 20.10 mm | 6.16 mm | 0.995 | 2.59 |
| 4 | 1250° C. | 5 min | 18.42 mm | 5.78 mm | 10.21 | 23.24 |
| 5 | 1250° C. | 10 min | 18.35 mm | 5.72 mm | 10.63 | 24.61 |

Figure 2:
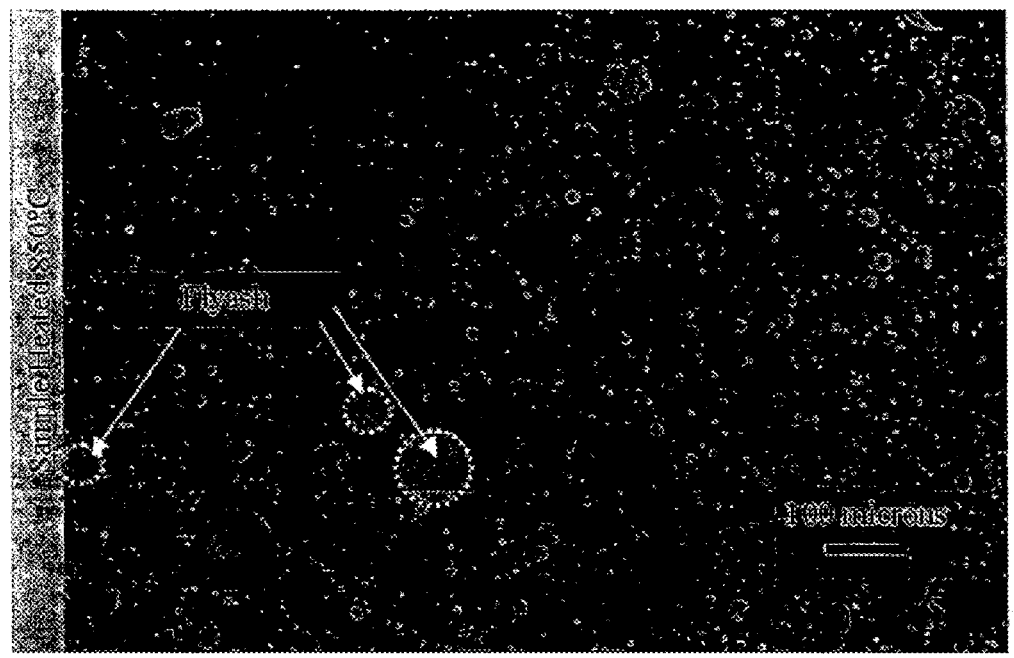
FIG. 2 is an SEM image showing microstructure of tile sample after heating at 850° C. for 3 min.
Figure 3:
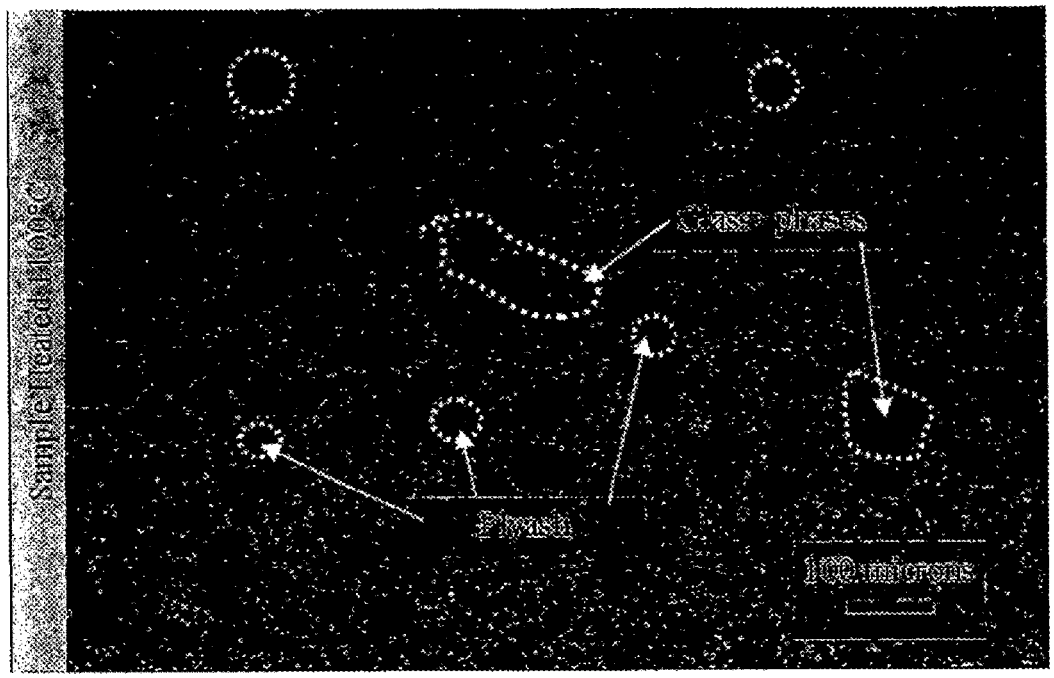
FIG. 3 is an SEM image showing microstructure of tile sample after heating at 1100° C. for 3 min.
Figure 4:
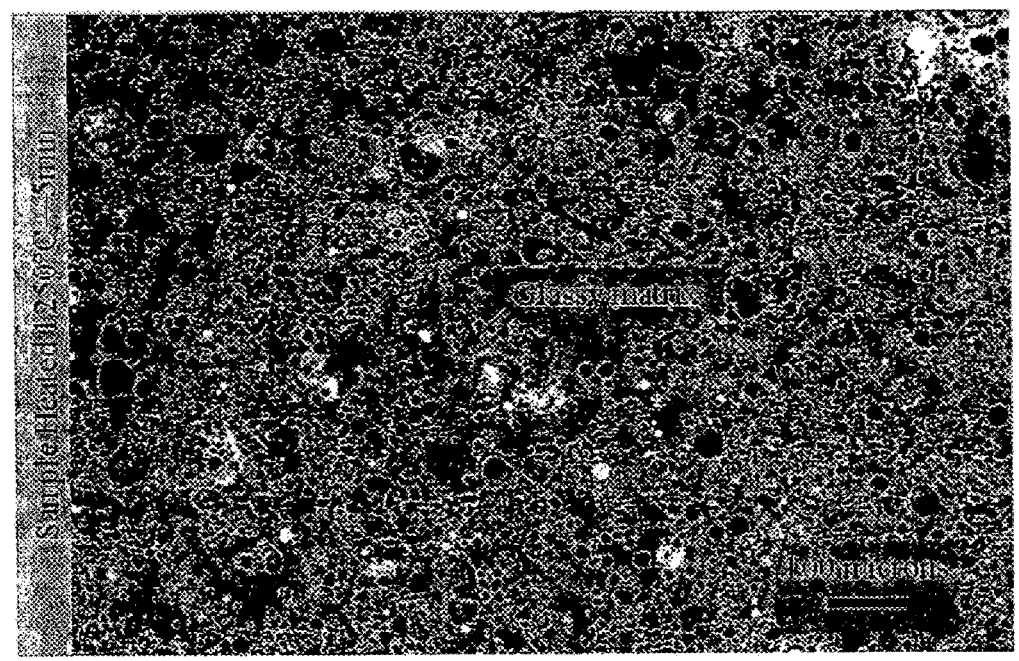
FIG. 4 is an SEM image showing microstructure of tile sample after heating at 1250° C. for 5 min.
Figure 5:
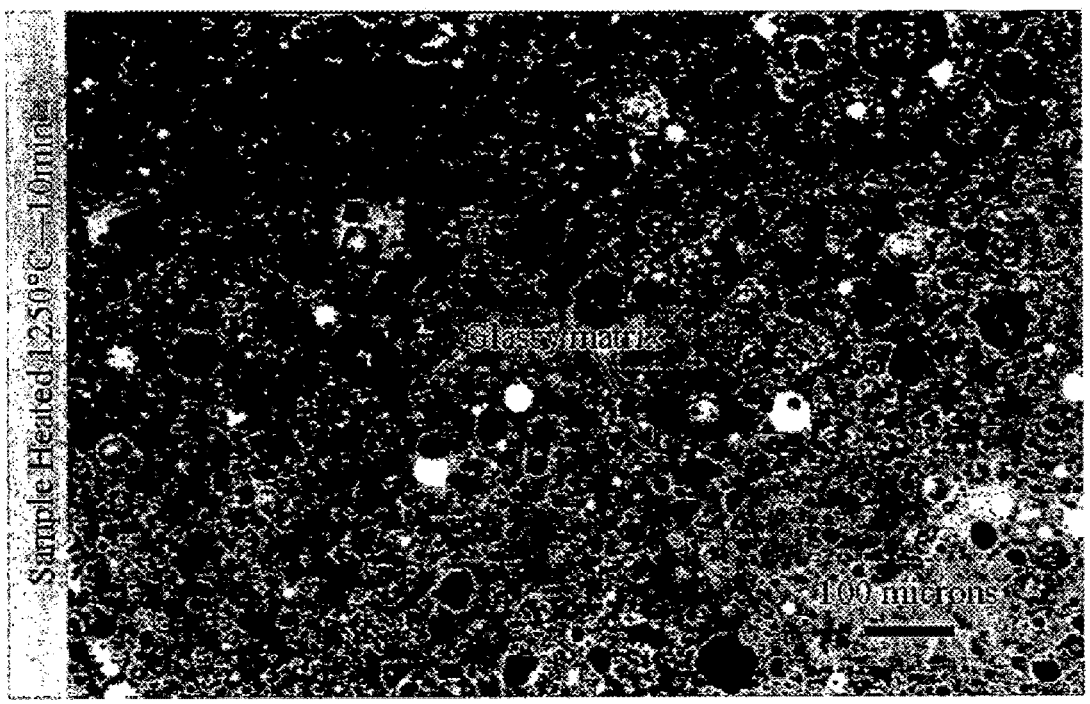
FIG. 5 is an SEM image showing microstructure of tile sample after heating at 1250° C. for 10 min

Microstructural Changes in the Tiles During the Sintering Cycle:

The substrates after the different stages of the sintering cycle were mounted in resin, and then sectioned, and then remounted in resin. Then polishing was done over several stages to finally obtain a 1 micron surface finish. Then the mounted samples were carbon coated for observation using the scanning electron microscope. Elemental distributions at different points in the microstructure were analysed semi-quantitatively using EDS (Energy Dispersive spectroscopy). The SEM images are shown in FIGS. 1 to 5. The analysis revealed the following:

- SEM images revealed that samples heated at 400° C., 850° C. and 1100° C. looked similar in terms of overall microstructural features.
- However the sample heated at 850° C. appeared to have greater porosity than the sample at 400° C. This could be due to the loss of organic carbons from the materials at 700-800° C.
- Moreover, at these temperatures, quartz inversion is believed to occur in the clay, which results in a slight expansion of quartz containing phases, leading to an increased porosity.
- The sample heated at 1100° C. showed the presence of small amounts of glassy phases in the microstructure, suggesting the initiation of the melting of phases in the refractory.
- The samples heated at 1250° C. for different durations showed the presence of glassy phases in the microstructure.
- The formation of these phases is due to the melting of the soda-feldspar, and some minor portion of the clay. The formation of these phases helped to decrease the overall porosity of the ceramic matrix due to the glassy phases filling up the pores.
- A greater extent of glassy phase formation is seen in the sample heated at 1250° C. for a longer time (10 min) as indicated by the lower extent of porosity within the ceramic matrix. This clearly indicates that liquid phase sintering is responsible for the improvement in the shrinkage, and strength of the fly ash containing tiles.
- Iron oxide phases are observed as white particles in the refractory matrix, and they are observed not to melt at these temperatures.

Further Examples

Further examples were conducted using various fly ash types as specified below and other constituents as detailed in Tables 1 and 2.

The fly ash was pre-screened to 100 mesh to remove larger particles. The pre-screened fly ash was then blended with the other constituents and the blended mixture was milled The resulting composition had the appearance of a micronized powder. In some tests, the mixture was sieved in a 325 mesh sieve to prevent agglomeration. Water was added to the milled composition to improve mouldability and thoroughly mixed. The mixture was then placed in moulds for pressing and firing.

The test samples were formed from 25 grams of the mixture and were pressed to test discs having a diameter of 50.5 mm that were subsequently fired.

The composition of the fly ash used in the tests detailed in Tables 1 and 2 was as follows

| fly ash type | Al2O3 | SiO2 | Fe2O3 | CaO | MgO | LOI |
|---|---|---|---|---|---|---|
| Yu-Huan | 34.32% | 52.59% | 4.80% | 3.49% | 0.87% | 0.89% |
| Hebi | 19.43% | 56.37% | 4.99% | 4.39% | 0.72% | 3.59% |
| Wang-Tang | 37.81% | 49.50% | 4.96% | 3.72% | 0.96% | 1.51% |
| Yuan-Ping | 33.94% | 49.68% | 4.72% | 6.71% | 1.48% | 1.09% |
| Wang-Tang | 37.81% | 49.50% | 4.96% | 3.72% | 0.96% | 1.51% |

In the tests conducted in Table 1, shrinkage and water absorption properties were measured. The composition of the mixture and the pressing load, water content, and firing temperatures were varied as detailed in Table 1.

In each of the tests identified in Table 1, the green article formed from pressing and before firing had adequate green strength to be handled, the green article was fired without curing.

In the tests conducted in Table 2, strength of the green article, and the shrinkage and water absorption properties of the sintered article were measured. The composition and preparation of the mixture, and the pressing load were varied as detailed in Table 1. The firing profile was consistent across the tests which involved a ramp up of the temperature over the firing time with a three minute dwell at the peak temperature. Again the green articles were fired without requiring curing.

TABLE 1

| Number of the test | Fly Ash | white clay | Talc | feldspar | Other | Water added | Pressing Force | Top firing temp | Mid Cycle Soaking at 400 C. in Minutes | Mid Cycle Soaking at 720 C. in Minutes | Soaking at top temp in Minutes | Cycle in Minutes | fly ash type | Shrinkage % | water absorption |
|---|---|---|---|---|---|---|---|---|---|---|---|---|---|---|---|
| 1 | 85% | 4% | 9% | 0% | 1% | 5% | 80 MPA | 1170 | 10 | 10 | 30 | 80 | YuHuan | 2.00% | 0.00% |
| 2 | 90% | 4% | 4% | 0% | 1% | 5% | 80 MPA | 1170 | 10 | 10 | 30 | 80 | YuHuan | 4.00% | 2.00% |
| 3 | 95% | 3% | 2% | 0% | 0% | 4% | 80 MPA | 1190 | 5 | 0 | 3 | 47 | Hebi | 6.00% | 2.00% |
| 4 | 50% | 0% | 0% | 0% | 50% | 5% | 80 MPA | 1180 | 5 | 10 | 2 | 48 | Hebi | 10.00% | 0.20% |
| 5 | 60% | 40% | 0% | 0% | 0% | 11% | 36 MPA | 1250 | 0 | 0 | 5 | 53 | WangTang | 10.00% | 0.50% |
| 6 | 80% | 20% | 0% | 0% | 0% | 8% | 35 MPA | 1250 | 0 | 0 | 5 | 53 | YuanPing | 10.00% | 1.00% |
| 7 | 90% | 10% | 0% | 0% | 0% | 8% | 35 MPA | 1245 | 0 | 0 | 5 | 53 | YuanPing | 10.00% | 2.00% |
| 8 | 60% | 20% | 0% | 20% | 0% | 11% | 25 MPA | 1250 | 0 | 0 | 5 | 53 | WangTang | 12.00% | 0.20% |
| 9 | 60% | 10% | 0% | 30% | 0% | 11% | 35 MPA | 1250 | 0 | 0 | 5 | 53 | WangTang | 14.00% | 0.30% |

Notes:
Total water content at pressing was estimated to be in the order of 1% higher than water added value (to take into account water content held in plasticising agent)
Tests 1 and 2—"Other"—superplasticiser—
Test 4—"Other"—60% flyash, 20% white clay, 20% feldspar mixed and ground and screen at 400 mesh (37 micron)

TABLE 2

| sample # | Fly ash | Fly ash type | white clay | bentonite | screen | pressing | set temperature | dwell at top temp | total heat time | water content | shrinkage | water absorption estimate | weight loss on firing | green strength |
|---|---|---|---|---|---|---|---|---|---|---|---|---|---|---|
| 10 | 70 | Heibi | 30 | 0 | 325 mesh | 20 Mpa | 1210 | 3 min | 3 hrs | 8% | 12.7% | 0.22% | 12% | passed[2] |
| 11 | 70 | Heibi | 10 | 20 | 325 mesh | 20 Mpa | 1210 | 3 min | 3 hrs | 8% | 9.1% | 0.20% | 16% | passed[2] |
| 12 | 75 | Heibi | 25 | 0 | 325 mesh | 20 Mpa | 1210 | 3 min | 3 hrs | 8% | 12.7% | 0.28% | 16% | passed[2] |
| 13 | 75 | Heibi | 10 | 15 | 325 mesh | 20 Mpa | 1210 | 3 min | 3 hrs | 8% | 10.1% | 0.30% | 12% | passed[2] |
| 14 | 85 | Heibi | 15 | 0 | 325 mesh | 20 Mpa | 1210 | 3 min | 3 hrs | 8% | 12.1% | 0.55% | 16% | passed[2] |
| 15 | 85 | Heibi | 10 | 5 | 325 mesh | 20 Mpa | 1210 | 3 min | 3 hrs | 8% | 13.3% | 0.60% | 12% | passed[2] |
| 16 | 70 | Heibi | 30 | 0 | 325 mesh | 40 Mpa | 1210 | 3 min | 3 hrs | 8% | 10.1% | 0.15% | 16% | passed[2] |
| 17 | 70 | Heibi | 10 | 20 | 325 mesh | 40 Mpa | 1210 | 3 min | 3 hrs | 8% | 7.1% | 0.18% | 16% | passed[2] |
| 18 | 75 | Heibi | 25 | 0 | 325 mesh | 40 Mpa | 1210 | 3 min | 3 hrs | 8% | 10.1% | 0.25% | 16% | passed[2] |
| 19 | 75 | Heibi | 10 | 15 | 325 mesh | 40 Mpa | 1210 | 3 min | 3 hrs | 8% | 7.9% | 0.20% | 16% | passed[2] |
| 20 | 85 | Heibi | 15 | 0 | 325 mesh | 40 Mpa | 1210 | 3 min | 3 hrs | 8% | 11.3% | 0.50% | 16% | passed[2] |
| 21 | 85 | Heibi | 10 | 5 | 325 mesh | 40 Mpa | 1210 | 3 min | 3 hrs | 8% | 10.7% | 0.50% | 16% | passed[2] |
| 22 | 70 | Heibi | 30 | 0 | no mesh[1] | 20 Mpa | 1230 | 3 min | 3 hrs | 8% | 8.7% | 1% | 16% | passed[2] |
| 23 | 70 | Heibi | 10 | 20 | no mesh[1] | 20 Mpa | 1230 | 3 min | 3 hrs | 8% | 7.1% | 1.20% | 16% | passed[2] |
| 24 | 75 | Heibi | 25 | 0 | no mesh[1] | 20 Mpa | 1230 | 3 min | 3 hrs | 8% | 8.5% | 1.80% | 8% | passed[2] |
| 25 | 75 | Heibi | 10 | 15 | no mesh[1] | 20 Mpa | 1230 | 3 min | 3 hrs | 8% | 8.9% | 1% | 12% | passed[2] |
| 26 | 85 | Heibi | 15 | 0 | no mesh[1] | 20 Mpa | 1230 | 3 min | 3 hrs | 8% | 9.1% | 2.20% | 8% | passed[2] |
| 27 | 85 | Heibi | 10 | 5 | no mesh[1] | 20 Mpa | 1230 | 3 min | 3 hrs | 8% | 8.9% | 4% | 12% | passed[2] |
| 28 | 70 | Heibi | 30 | 0 | no mesh[1] | 40 Mpa | 1230 | 3 min | 3 hrs | 8% | 7.1% | 2.50% | 8% | passed[2] |
| 29 | 70 | Heibi | 10 | 20 | no mesh[1] | 40 Mpa | 1230 | 3 min | 3 hrs | 8% | 4.6% | 0.90% | 16% | passed[2] |
| 30 | 75 | Heibi | 25 | 0 | no mesh[1] | 40 Mpa | 1230 | 3 min | 3 hrs | 8% | 7.5% | 1.30% | 8% | passed[2] |
| 31 | 75 | Heibi | 10 | 15 | no mesh[1] | 40 Mpa | 1230 | 3 min | 3 hrs | 8% | 5.7% | 0.80% | 16% | passed[2] |
| 32 | 85 | Heibi | 15 | 0 | no mesh[1] | 40 Mpa | 1230 | 3 min | 3 hrs | 8% | 8.2% | 3% | 12% | passed[2] |
| 33 | 85 | Heibi | 10 | 5 | no mesh[1] | 40 Mpa | 1230 | 3 min | 3 hrs | 8% | 7.9% | 4% | 12% | passed[2] |

Notes:
1) "no mesh" means no particular mesh was applied to the powder.
2) "no mesh" particles are in a range of 8-250 mesh in size
3) passing green strength means over 1.8 kg/cm$^2$ The shaped article produced exhibits high strength and low porosity. Moreover, the articles, and in particular tiles, made by this process may be manufactured in commercial quantities, with at least 35% less energy input and be cost competitive with existing tile products. The tiles are able to be formed having adequate green strength to allow handling by automated equipment, can be fired without requiring significant curing, and aggressively cooled. Further, by controlling of the combination of water content, the amount and type of plasticising agents, the particle size of the milling process, the applied pressure, and the firing/cooling curve, the technical properties of the sintered article can be adjusted to cater for the particular technical demand of the application of the end product.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). Further, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods which can, of course, vary. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method of forming a shaped article having a matrix containing sintered fly ash, the method comprising the steps of:
   providing in a mould a mixture containing a fly ash composition comprising fly ash and a plasticising agent, the fly ash composition being in a powder form having an average particle size of less than 50 μm (micron), and wherein the fly ash composition includes greater than 70% fly ash by dry weight of the fly ash composition, and wherein the plasticising agent being capable of binding the fly ash particles in the fly ash composition together on pressing of the fly ash composition;
   pressing the particulate fly ash mixture by uniaxial pressing at a pressure of greater than 200 kg/cm$^2$ in the mould to temporarily bind the mixture to form a green article shaped by the mould, wherein the water content in the green article is less than 6 wt % of the total weight of the green article, and wherein the modulus of rupture of the green article is greater than 1.5 kg/cm2 so as to enable handling of the green article by handling equipment; and
   firing the green article to sinter the fly ash;
   wherein the mixture has substantially no green strength prior to pressing the mixture.

2. A method according to claim 1, wherein the mixture contains additional water to that contained in the fly ash composition.

3. A method according to claim 1, wherein the mixture comprises from 80 to 98 wt % of the fly ash composition by dry weight of the mixture.

4. A method according to claim 1, wherein the thickness of the shaped article is less than 40 mm.

5. A method according to claim 1, further comprising the step of firing the green article containing substantially the same water content present at forming of that green article.

6. A method according to claim 1, wherein the plasticising agent includes a superplasticiser.

7. A method according to claim 1, wherein the green article is fired without any substantial curing of the green article.

8. A method according to claim 1, wherein the firing of the article includes a fly ash sintering phase where the fly ash in the green article is sintered at a temperature of from 1000° C. to 1300° C.

9. A method according to claim 1, wherein the article is cooled at a rate greater than or equal to 200° C./ minute after firing.

* * * * *